Nov. 13, 1962  H. L. DANIELS ETAL  3,063,181
SLIDE MANIPULATOR
Filed June 4, 1959  2 Sheets-Sheet 1
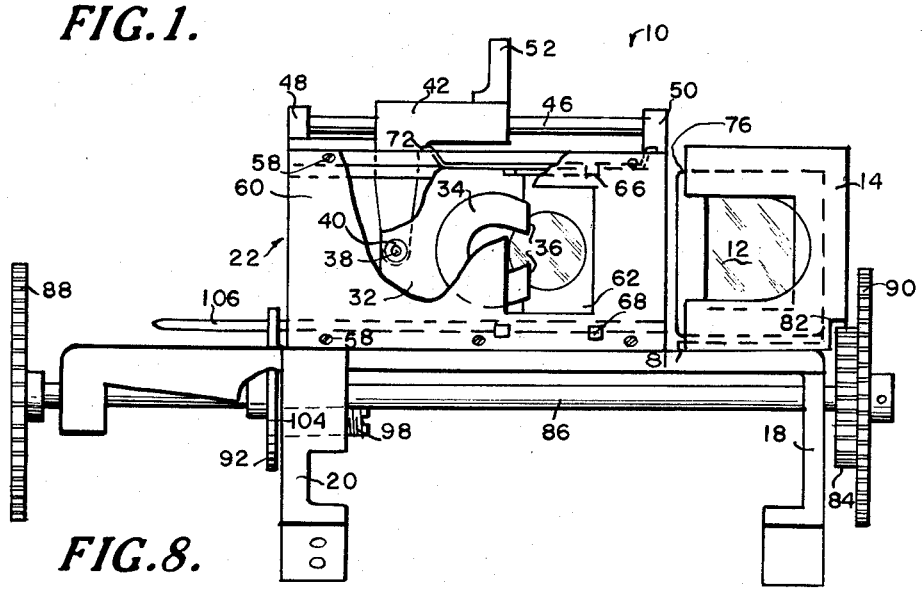
FIG. 1.
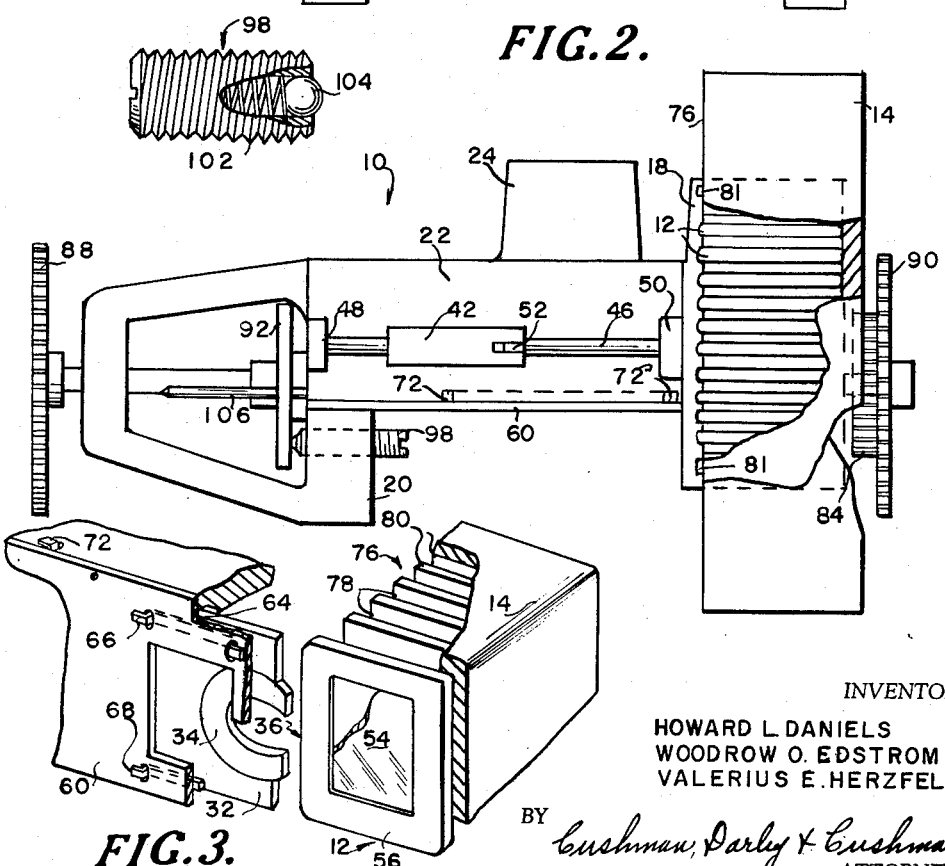
FIG. 8.
FIG. 2.
FIG. 3.
INVENTORS
HOWARD L. DANIELS
WOODROW O. EDSTROM
VALERIUS E. HERZFELD
BY Cushman, Darby & Cushman
ATTORNEYS

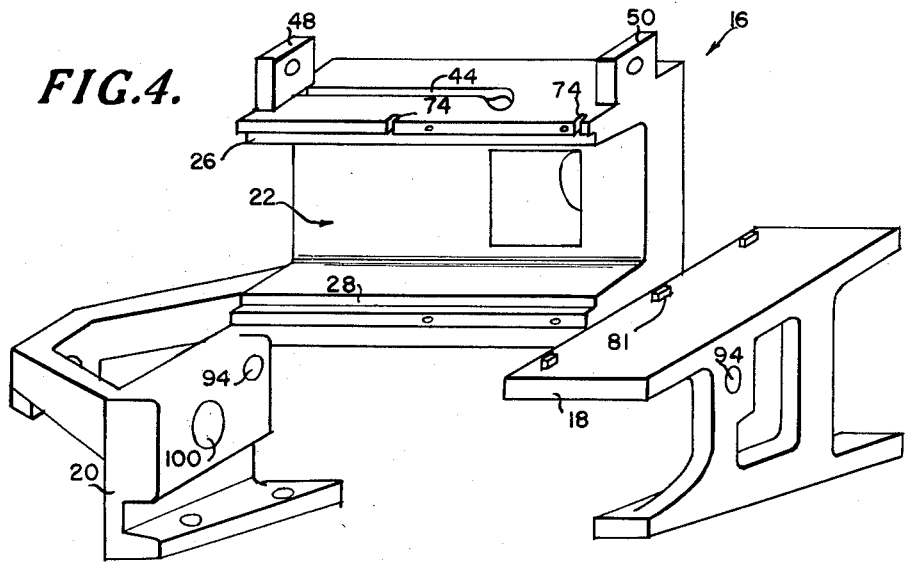
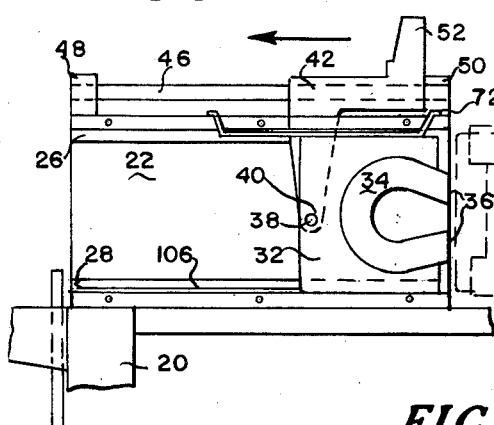
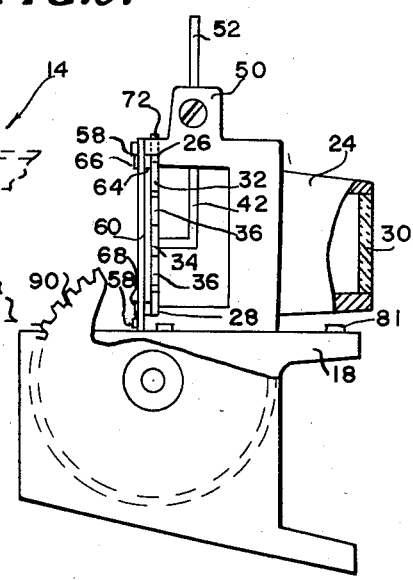
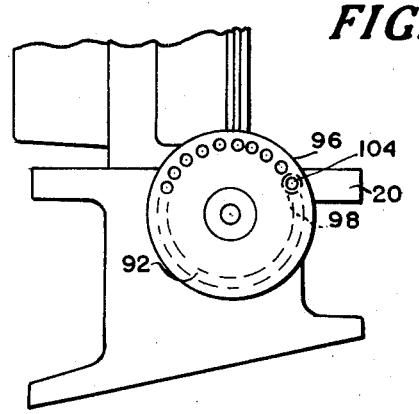
INVENTORS
HOWARD L. DANIELS
WOODROW O. EDSTROM
VALERIUS E. HERZFELD
BY Cushman, Darby & Cushman
ATTORNEYS United States Patent Office 3,063,181
Patented Nov. 13, 1962

3,063,181
SLIDE MANIPULATOR
Howard L. Daniels, West St. Paul, Woodrow O. Edstrom, Minneapolis, and Valerius E. Herzfeld, St. Paul, Minn., assignors to Sperry Rand Corporation, New York, N.Y., a corporation of Delaware
Filed June 4, 1959, Ser. No. 818,132
8 Claims. (Cl. 40—79)

This invention pertains to slide viewing or projecting devices and more particularly to an improved slide manipulator for selecting one of a plurality of slides from a storage cartridge and for accurately positioning the selected slide in the projecting system of such devices.

Apparatus heretofore employed for the above purposes has customarily utilized some form of mechanical connection between the selected slide and a positioning member. An example of this type apparatus, utilizing a "hook and notch" engagement between the slides and a positioning member, may be seen in the Fritze et al. application Serial No. 729,112, entitled "Input-Output Device," filed April 17, 1958. This, and other types of purely mechanical connections, suffer the inherent limitation that there must be some slight amount of "play" or looseness of fit between the slide and connected positioning member or surface. Thus, some small displacement or misalignment of the slide is always possible. At first appearance this may seem insignificant. But magnified through a lens system, the displacement may cause serious complications, especially in projecting devices requiring accurate registration of the slide, such as in the Fritze device mentioned above.

An important object of this invention is to provide manipulating apparatus for positioning a slide in a projection or viewing device so that accidental displacement or misalignment thereof is impossible, and exact registration of the slide in the system is assured.

A related and somewhat more specific object resides in the utilization of magnetic attraction, rather than a mechanical linkage, to hold a slide in exact registration in a viewing or projecting system. The magnetic attraction may be between a slide and a movable positioning member containing or itself comprising an aligning surface, or between a slide or other movable member and one or more stationary aligning surfaces.

Another object resides in the provision of a slide manipulator which is not susceptible to jamming, even when an attempt is made to insert a bent or multilated slide in the viewing device.

A further object is to provide improved means for selecting a desired slide from a storage cartridge and for positioning the selected slide accurately in a viewing device, and associated means for assuring that the slide is returned to its proper compartment within the cartridge after viewing.

Still other objects and advantages will become apparent by reference to the following detailed description of an exemplary embodiment of the invention. The various features thereof may best be understood with reference to the accompanying drawings in which like numerals indicate like parts, and in which:

FIGURE 1 is a rear view of a slide manipulator embodying the invention, with the slide storage cartridge positioned thereon, and with parts of the rear cover plate and mounting plate being broken away;

FIGURE 2 is a top plan view of the manipulating device seen in FIGURE 1;

FIGURE 3 is an enlarged perspective view of a slide positioned opposite the port of the projecting station, broken away portions of the rear cover plate and slide storage cartridge also being shown;

FIGURE 4 is a perspective view of the frame of the device;

FIGURE 5 is a rear view of the slide positioning plate seen in FIGURE 1 in its extreme right-hand position, with portions of a slide and the cartridge being shown in phantom lines;

FIGURE 6 is an end view looking from the right in FIGURE 5, with the rear cover plate also being shown;

FIGURE 7 is a partial end view looking from the left in FIGURE 1, showing the cartridge detent and, locking wheel; and FIGURE 8 is a plan view of the cartridge detent pin partially broken away.

This invention is shown and described as applied to a slide manipulator 10 such as that shown in FIGURES 1 and 2, which may form an integral part of a viewing or projecting system or device, and within which one of a plurality of slides 12 from a storage cartridge 14 may be positioned for viewing or projecting. The manipulator 10 may conveniently be assembled from a frame 16, shown most clearly in FIGURE 4, and comprising generally: supports 18 and 20; a rectangular structure 22, which may for convenient reference be termed a projecting station; and a lens housing 24 (FIGURES 2 and 6).

When a slide 12 is properly positioned across the optical axis of the system within projection station 22, light from a suitable source (not shown) to the rear of manipulator 10 may pass therethrough to a projecting lens 30 mounted in lens housing 24, and thence to a projecting screen or other suitable surface (not shown) either integral with or in front of the manipulator. In order to receive a slide 12, and hold it upright for projection in station 10, upper and lower guideways 26 and 28 (best seen in FIGURE 4) may extend transversely thereof. Preferably these guideways are an integral part of frame 16, as is lens housing 24, so that manufacture of the manipulator is simplified, while the maintenance of close tolerances is facilitated. The vertical distance between the horizontal surface of guides 26, 28 is only slightly greater than the height of a slide 12. Thus only limited vertical movement of a slide held therebetween is possible, and as explained hereinafter, means are provided to eliminate the possibility of even this limited displacement of the slide.

To position a slide 12 selected from storage cartridge 14 between guides 26, 28, there may be slidably mounted between these guides a plate member 32 (FIGURES 1 and 5). The height of plate 32 is approximately the same as that of a slide 12, so that it also is closely held between guides 26, 28.

An L-shaped arm 42 is attached to plate 32, preferably by means of a pin 38 extending through a rubber grommet 40 set within the latter, so that mechanical shocks are not transmitted from the arm to plate 32. Arm 42 extends upwardly through a slot 44 (FIGURE 4) provided in frame 16, and is slidably mounted upon a rod 46 (FIGURE 1) which is secured between ears 48, 50, which are provided atop projecting station 22. Ears 48 and 50 may, by proper location thereof, conveniently serve as stops or abutments to limit the sliding movement or traverse of arm 42, in addition to supporting rod 46. Of course other suitable stop means, such as slidable collars (not shown) adjustably secured to rod 46 by set screws, or the like, could be employed for this purpose.

The sliding movement of arm 42 may conveniently be produced, manually or otherwise, through an actuating lever 52 separately attached thereto or formed integral therewith as shown. When lever 52 is moved transversely of manipulator 10 along rod 46, it is apparent that plate 32 will be carried therewith between guides 26, 28 so as to occupy a rightward position as shown in FIGURE 5 or any position to the left thereof. When in its FIGURE 5 position, with arm 42 abutting ear 50, the right edge of plate 32 will be directly opposite a selected slide 12 positioned there by the cartridge 14, in a manner to be described more fully hereinafter.

A most important and significant feature of this invention resides in the utilization of magnetic means in association with plate 32. This may take the form of a magnet 34, attached to or embedded within plate 32, so that the pole pieces 36 thereof project slightly beyond the surrounding adjacent edge of the plate. Preferably a permanent type magnet is utilized, since it is less subject to breakdown or failure and is less expensive than an electromagnet, and additionally requires no leads thereto. The pole pieces 36 of magnet 34 are accurately machined, thus presenting true aligning surfaces to a slide 12 positioned thereagainst.

This slide 12 may comprise, as best seen in FIGURE 3, the usual photographic or other suitable transparency sandwiched between glass plates 54 and surrounded by a frame 56. At least the edge of frame 56 adjacent magnet 34 should be accurately formed, and some part thereof constructed of a material, for example ferrous metal, responsive to magnetic attraction, so that when a slide 12 and poles 36 of magnet 34 are brought into proximity, they will be attracted together and held in intimate contact until forcibly disengaged. Once in engagement with poles 36, no accidental slippage of slide 12 relative thereto will be possible due to the magnetic attraction therebetween and the accuracy of the smooth abutting surfaces of each.

With lever 52 in its right-most position as seen in FIGURE 5, a slide 12 will be attracted to and held in contact with poles 36. When lever 52 is moved to its extreme left position, so that arm 42 is abutting ear 48, the combined width of plate 32 and the projecting portion of magnet 34 is such that a slide 12 held securely against poles 36 by magnetic attraction will be properly positioned between the light source (not shown) of the device and condensing lens 30, in exact registry with the optical axis of the system.

Secured to the rear of the projection station 22, as by means of screws 58, there may be a cover plate 60 with a rectangular aperture 62 for permitting passage of light therethrough. Cover plate 60 and the inner vertical surfaces of guideways 28, 30 define a port 64, of slightly greater width than the thickness of a slide 12, through which a single slide may pass during insertion into and withdrawal from station 22.

To further insure proper positioning of a slide 12 within station 22, a plurality of resilient spring members may be provided to act thereagainst. Thus leaf springs 66 and 68 (best seen in FIGURES 1 and 3) may extend through slots 70 provided therefor in plate 60, so that their restoring force holds a slide 12 firmly against the vertical surfaces of guides 26, 28. Similarly, a third leaf spring 72 (most clearly shown in FIGURE 5) may be mounted in slots 74 in frame 16 (FIGURE 4), so as to urge the slide downwardly against the horizontal surface of guideway 28, thus eliminating all possibility of accidental vertical displacement of a slide, as mentioned heretofore. It will be observed that the springs 66, 68 and 72, also act against plate 32 as it is moved back and forth, in the same manner as upon a slide 12.

A pluraltiy of slides 12 may be contained within the storage cartridge 14, which is of generally rectangular shape as best seen in FIGURES 1, 2 and 3. One side 76 of cartridge 14 is open to allow insertion and removal of slides from individual slide storage compartments 78 which may be defined therein by a plurality of web-like transverse dividers 80. The width of a slide 12 is slightly greater than the width of the cartridge 14, so that a portion of the slides carried therein projects from the open side 76. When cartridge 14 is positioned upon support 18 of manipulator 10, the open side 76 is facing projection station 22 so that the projecting edge of any slide 12 may be placed opposite port 64 by moving cartridge 14 longitudinally. Lugs 81 may be provided on support 18 to prevent inward transverse movement of the cartridge, or, if desired, a suitable trackway (not shown) within which cartridge 14 might ride, can be secured to support 18.

In order to prevent slide damage and to asure that the desired compartment 78 will always be accurately positioned adjacent port 64 for slide insertion and removal, an improved and highly accurate cartridge positioning mechanism is provided. Along one edge of the cartridge 14 there may be a tooth-like structure or rack 82 indicated in FIGURE 1. Operatively associated with rack 82 is a gear drive mechanism best seen in FIGURES 1 and 2, comprised of gear 84, shaft 86, rotatable means 88 and 90, and detent wheel 92. Shaft 86 extends through holes 94 (see FIGURE 4) in frame 16, and has mounted thereon a gear 84, which is in direct driving relation with teeth 82 on cartridge 14. Rotatable means 88 and 90 may be gears, or notched discs or wheels as in the said Fritze et al. application, and are fixedly mounted upon opposite ends of shaft 86, so that either one or both can be moved by a finger or any other suitable means (not shown) to rotate shaft 86, and thus cause gear 84 to shift cartridge 14 along support 18. One apparent modification of this system would be to replace gear 88 with a segmented commutator connected through selector switches (not shown) with a suitable motor (not shown) drivably connected to gear 90, to provide an automatic selection of the desired slide when the proper selector switches are actuated.

Also fixedly mounted upon shaft 86, as at a point adjacent support 20, is the detent wheel 92. As best seen in FIGURE 7, wheel 92 is provided around its periphery with a plurality of holes 96, the angular spacing between these holes being such that rotation of wheel 92 through an angle equal to that between radii extending through the centers of adjacent holes advances cartridge 14 through a distance equal to the spacing between the slides therein. Engaging the detent wheel 92 is a set screw 98 mounted within a hole 100 (FIGURE 4) provided in frame 16. As seen in FIGURE 8, screw 98 is hollow and has an internal spring 102 which biases a ball 104 so that it partially protrudes from the open end of the screw. As detent wheel 92 is rotated, ball 104 is forced back against the bias of spring 102, but when a hole 96 passes in front of screw 98, ball 104 is snapped into the hole by the bias of spring 102 and acts as a ratchet. By proper orientation of wheel 92 with respect to rack 82 and gear 84, each stop position of shaft 86 will correspond to the positioning of a slide 12 opposite port 64. Accurate and speedy alignment of the desired slide compartment adjacent port 64 is thus assured, and the possibility of damage to a slide or the cartridge by attempted slide withdrawal from, or insertion in, an improperly aligned compartment, is minimized.

In projecting devices such as disclosed in the said Fritze et al. application, it is extremely important that a slide 12 be returned after viewing or projecting to the compartment 78 in which it has been prearranged. Otherwise misfiling would result and erroneous data might subsequently be obtained from the device. To prevent such an occurrence in the present device, an interlock is provided to prevent movement of cartridge 14 while a slide 12 is removed therefrom for viewing or projecting. This interlock may take the form of a rod 106 attached by any suitable means, such as welding, to the lower edge of plate member 32. Rod 106 is of such a length and so positioned that it will extend through a hole 94 in support 20 and into one of the holes 96 in detent wheel 92, locking the wheel in place, when plate 30 is in any but its right-most position (see FIGURES 1 and 2). Until plate 32 is moved to the extreme right (see FIGURE 5), at which position the slide 12 which it carries will be within the proper compartment 78, gear 84 and cartridge 14 are therefore also locked in place. When slide 12 is repositioned in its respective compartment 78, rod 106 is out of any hole 96 in detent wheel 92 and cartridge 14 is once again fre for movement.

Viewed briefly in its entirety, the operation of a viewing or projecting device equipped with the manipulator of the present invention is as follows. A plurality of slides 12 having been prearranged in respective compartments 78 of cartridge 14, the cartridge is shifted longitudinally by its gear drive mechanism, each slide which passes port 64 being in turn attracted to magnet 34. These slides, however, will be whisked from poles 36 by continued movement of cartridge 14 until the desired one is stopped opposite port 64, the detent mechanism assuring exact alignment therewith. At this time poles 36 and the selected slide will be held in intimate accurate contact by the magnetic attraction therebetween. When plate 32 is moved to its left-most position, the slide will be in exact registration for viewing, due mainly to its intimate contact with poles 36, and also to the action of springs 66, 68 and 72. After viewing, the slide is returned to its compartment 78 within cartridge 14, which has been held against movement by interlock rod 106 while the slide was removed therefrom. The cartridge may then be moved once again, to whisk the viewed slide from poles 36, and station another opposite port 64.

The strength of magnet 34 is such that if a bent or mutilated slide is selected for viewing, it can be carried through port 64 but is prevented from being placed in viewing position by the leaf springs 66, 68, 72. Thus, if lever 52 is continued in its leftward movement, the attracting force of the magnet will be exceeded and the bent slide will be disconnected therefrom. However, since mechanical, as well as magnetic, force is utilized to replace the slide in the cartridge 14 upon rightward movement of lever 52, a much greater force can be exerted in opposition to the frictional jamming forces acting upon the bent slide. Removal of the bent slide can therefore be easily accomplished, whereas in mechanical manipulation devices the bent slide frequently becomes jammed so tight upon insertion thereof that removal becomes difficult.

It thus will be seen that there has been provided by this invention a device in which the various objections and advantages hereinbefore set forth have been achieved. Utilization of magnetic attraction between a slide and positioning member eliminates the possibility of slide misalignment or displacement, which as noted heretofore is inherent in devices employing purely mechanical slide positioning means. Additionally, refiling of slides incorrectly within the storage cartridge is prohibited, and possible damage to slides is minimized by the improved cartridge positioning mechanism.

Modification of this invention not described or indicated herein will become apparent to those of ordinary skill in the art after reading this disclosure. Therefore, it is intended that the matter contained in the foregoing description and accompanying drawings be interpreted as illustrative and not limitative, the scope of the invention being defined in the appended claims.

What is claimed is:

1. Slide manipulating apparatus for a viewing or projecting system having an optical axis and a cartridge containing a plurality of equidistantly spaced-apart, light projectable slides, each slide including a film and a magnetic frame portion, the apparatus comprising:
   A. a transfer station;
   B. cartridge moving means for selectively positioning any one of the slides at the transfer station and comprising:
      (a) a rotatable shaft having individual rotatable means fixedly attached to the ends thereof for rotation therewith,
      (b) rotatable gear means fixedly attached to the shaft and operatively associated with the cartridge for imparting motion thereto upon the rotation of the shaft;
      (c) a detent wheel fixedly attached to the shaft and having a plurality of holes therethrough, the angular spacing between the holes being such that rotation of the wheel through an angle equal to that angle between wheel radii extending through the centers of adjacent holes is effective to move the cartridge through a distance substantially equal to the center-to-center spacing between the slides therein,
      (d) spring loaded ball means cooperating with the detent wheel such that when the slide is positioned at the transfer station the ball means seats in one of the holes for releasably holding the detent wheel;
   C. a slide projecting station extending across the optical axis of the system;
   D. slide positioning means for locating and releasably securing the slide in a predetermined position in the slide projection station and for maintaining alignment of the slide with respect to the optical axis of the system, the positioning means including,
      (a) a pair of parallel guideways disposed on opposite sides of the projection station for slidably receiving the slide,
      (b) a first spring means associated with one of the guideways for vertically biasing the slide for precluding vertical misalignment thereof,
      (c) a second spring means cooperating with the guideways for horizontally biasing the slide for precluding horizontal misalignment thereof,
      (d) a magnetized means having a plurality of vertically aligned surfaces for magnetically engaging the magnetic frame portion,
      (e) a plate member fixedly secured to the magnetized means and located in the guideways and being reciprocally slidable therein between first and second positions,
      (f) the first position being such that the slide then in engagement with the magnetized means is in registry with the optical axis of the system,
      (g) the second position being such that the slide then in engagement with the magnetized means is practically contained within the cartridge;
   E. means for locking the cartridge against movement while a slide is removed therefrom, which locking means includes a rod member fastened to the plate member and extending outwardly therefrom such that when the plate member is in the first position the rod member is received by one of the holes in the detent wheel for preventing movement thereof.

2. In a slide manipulating apparatus for a viewing or projecting system having an optical axis within a projecting station and a cartridge containing a plurality of slides, each slide including a film and a magnetic frame portion, the improvement comprising:
   A. means for releasably holding a slide in alignment with the optical axis of the system, the holding means including,
   B. a pair of parallel guideways disposed on opposite sides of the projecting station slidably containing the slide;
   C. magnetized means magnetically engaging the slide and limiting movement thereof in a first direction;
   D. a first spring means cooperating with a portion of one of the guideways for biasing the slide and limiting the movement thereof in a second direction;

E. a second spring means cooperating with a portion of each of the guideways for biasing the slide and limiting movement thereof in a third direction, the first, second and third directions being mutually perpendicular.

3. In a slide manipulating apparatus for removing a slide which includes a light projectable film having a magnetically susceptible frame portion from a movable cartridge means containing a plurality of slides, and transferring the slide to a slide projection station within a projecting system for releasably holding the slide in alignment with the optical axis of the system, the improvement comprising:
- A. a pair of parallel guideways disposed on opposite sides of the projecting station for slidably receiving a slide;
- B. a plate member located in the guideways and being reciprocally slidable therein between first and second positions;
- C. a first spring means associated with one of the guideways for restricting motion of a slide in a first direction;
- D. a second spring means cooperating with the guideways for restricting motion of a slide in a second direction, the second direction being perpendicular to the first direction;
- E. magnetized means secured to the plate member for magnetically engaging the frame portion for restricting motion of a slide in a third direction while the plate member is in the first position, the third direction being perpendicular to the first and second directions;
- F. the first and second spring means, and the magnetized means cooperating when the plate member is in the first position to maintain alignment of the slide with the optical axis.

4. Slide manipulating apparatus as in claim 3 including:
- A. cartridge moving means comprising;
- B. a drive mechanism;
- C. a rotatable shaft in the mechanism;
- D. and the cartridge is locked against movement by means preventing rotation of the shaft.

5. Slide manipulating apparatus as in claim 4 wherein the cartridge locking means is remote from the slides in the cartridge and includes:
- A. a rod secured to the plate member;
- B. a detent wheel on the shaft;
- C. and the rotation of the shaft is prevented by engagement between the rod and wheel.

6. Slide manipulating apparatus as in claim 5 including:
- A. a biased member engaging the detent wheel;
- B. the member and the wheel acting as a ratchet for retarding rotation of thee wheel at predetermined position.

7. A slide manipulator as in claim 6 wherein:
- A. the cartridge moving means shifts the cartridge so as to place one of the plurality of slides therein adjacent the magnetized means when the plate member is in the second position,
- B. such that the magnetized means becomes yieldably magnetically associated with successive slides within the cartridge as it is moved.

8. A slide manipulator as in claim 4 including interlock means for rendering the cartridge moving means inoperative while the plate member is out of the second position.

References Cited in the file of this patent

UNITED STATES PATENTS

| | | |
|---|---|---|
| 553,369 | Thompson | Jan. 21, 1896 |
| 2,711,602 | Wilklund | June 28, 1955 |
| 2,724,989 | Badalich | Nov. 29, 1955 |
| 2,732,758 | Waller | Jan. 31, 1956 |
| 2,837,851 | Wiklund | June 10, 1958 |
| 2,878,604 | Mulch | Mar. 24, 1959 |
| 2,936,672 | May et al. | May 17, 1960 |

FOREIGN PATENTS

| | | |
|---|---|---|
| 18,733 | France | June 18, 1914 |
| 23,679 | France | Dec. 15, 1921 |
| 565,336 | France | Jan. 24, 1924 |
| 843,954 | France | July 13, 1939 |